Figure 1:
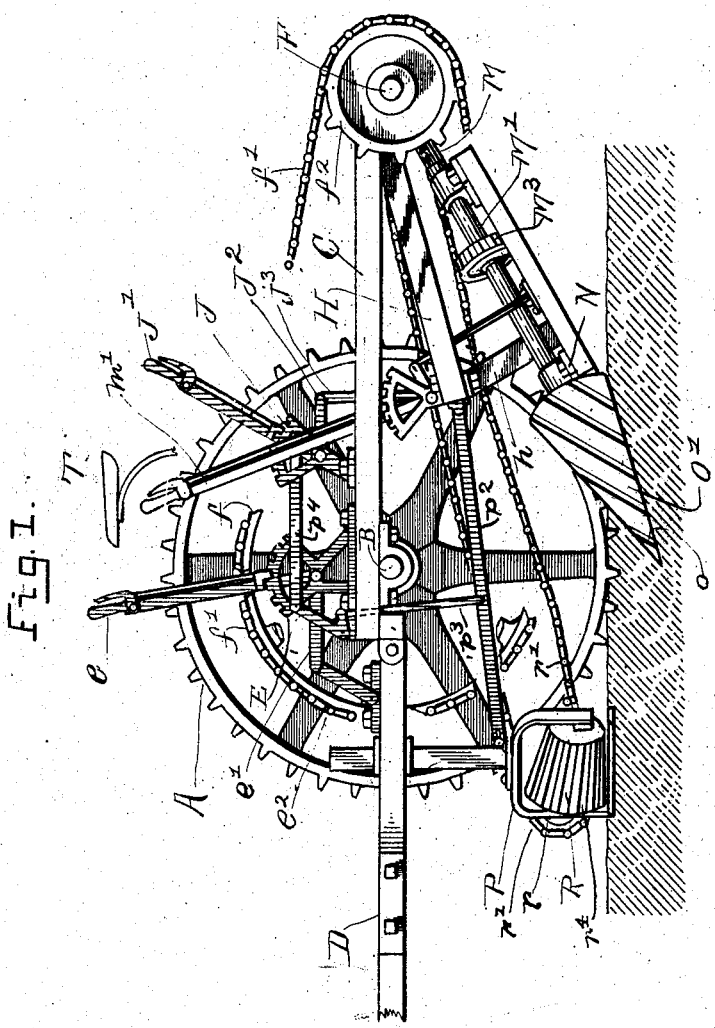

No. 823,583. PATENTED JUNE 19, 1906.
G. F. CONNER.
BEET HARVESTING MACHINE.
APPLICATION FILED FEB. 2, 1903.

2 SHEETS—SHEET 1.

Witnesses:

Inventor:
George F. Conner.
by Clement R. Stickney.
Attorney.

No. 823,583.
PATENTED JUNE 19, 1906.
G. F. CONNER.
BEET HARVESTING MACHINE.
APPLICATION FILED FEB. 2, 1903.
2 SHEETS—SHEET 2.
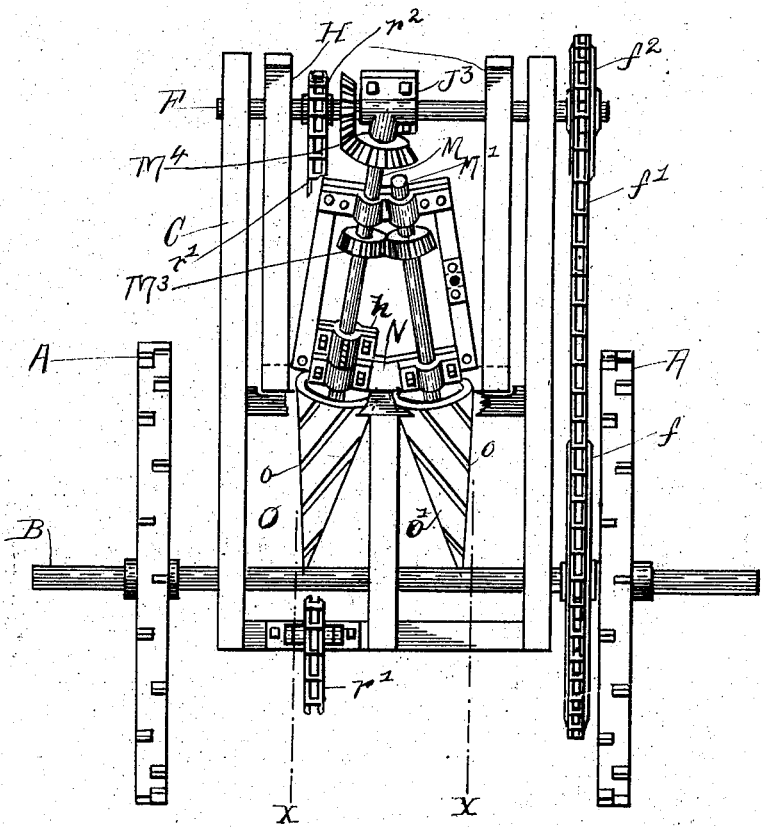
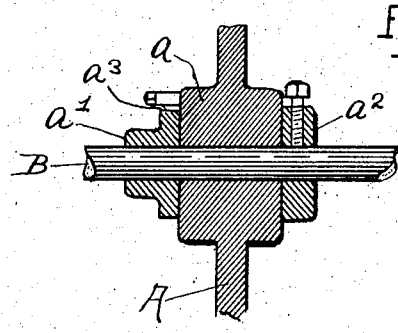
Witnesses:
Inventor:
George F. Conner.
by Clement R. Stickney.
Attorney.

UNITED STATES PATENT OFFICE.

GEORGE F. CONNER, OF PORT HURON, MICHIGAN.

BEET-HARVESTING MACHINE.

No. 823,583.

Specification of Letters Patent.

Patented June 19, 1906.

Application filed February 2, 1903. Serial No. 141,453.

*To all whom it may concern:*

Be it known that I, GEORGE F. CONNER, a citizen of the United States of America, and a resident of the city of Port Huron, in the county of St. Clair and the State of Michigan, have invented certain new and useful Improvements in Beet-Harvesting Machines, of which the following is a full, clear, and exact specification.

This invention relates to beet-harvesting machines, and especially to means for removing beets from any kind of soil and delivering them ready for treatment at a refinery.

The invention consists in the matters hereinafter set forth, and more particularly pointed out in the appended claims.

In the drawings, Figure 1 is a view in side elevation of a machine embodying the features of the invention, parts of the driving mechanism being omitted. Fig. 2 is a plan view of the machine, parts of the interlocking and topping mechanism being omitted. Fig. 3 is a view in section of a traction-wheel adjustment.

Referring to the drawings, the machine is supported and driven by a pair of traction-wheels A. Said wheels are preferably secured by ratchets or keys to a drive-shaft B in such a manner as to allow proper spacing to accommodate the machine to beet-rows of different width. A frame C, suitably constructed to insure lightness and rigidity, is pivotally secured by bearings on the main shaft B, and a frame D, to which draft-rigging may be attached, is pivotally connected to the front end of said frame so as to allow vertical angular adjustment of the two by a quadrant E, locking-lever $e$, lever-arm $e'$, and connecting-link $e^2$. A second shaft F is suitably journaled to the rear portion of the main frame C, parallel to the main shaft B, and preferably is driven therefrom by means of sprocket-and-chain connections $f f'' f^2$.

The beet-pulling mechanism proper is preferably secured to the main frame in the following manner: An auxiliary frame H is connected to said main frame so as to have angular adjustment in relation thereto. A preferable method which reduces the number of parts and insures strength is that herein indicated. The rear end is supported by suitable bearings on the shaft F. The forward end projects obliquely downward beneath the main frame C, to which it is movably connected, as herein shown, by a quadrant J, locking-lever J', lever-arm $J^2$, and link $J^3$. These form a convenient means for varying the relative angular relations of the auxiliary frame and the main frame at the will of the operator, although any suitable device may be used. A pair of inclined rearwardly-converging shafts M M', symmetrically disposed with regard to the longitudinal axis of the machine, are adjustably suspended below the auxiliary frame so that they may be rocked laterally. This adjustment is obtained in the following manner: The lead-shaft M of this pair has its rear upper end journaled in a thrust-bearing $J^3$, which rocks on the main shaft B. The forward lower end of the lead-shaft M is secured by a bracket-bearing $h$ to the auxiliary frame H so as to be raised and lowered in unison therewith by the lever J'. The lead-shaft M and follower M' are held in fixed lateral relation by a yoke-frame N, in which they are suitably journaled. One side of said yoke rides on and is supported by the lead-shaft M and is adjustably secured on the other side by link and a locking-lever $m'$ to the auxiliary frame H.

The two shafts M M' are connected by gearing $M^3$, so as to rotate in opposite directions, and the lead-shaft is conveniently driven from the shaft F by a pair of bevel-gears $M^4$. The tilting of the yoke, therefore, does not throw this driving mechanism out of adjustment, although any form of driving-gear and lateral tilting frame may be used which gives the required result.

A pair of pulling-cones O O' are secured to the lower end of the shafts M M', so as to enter the ground at a point approximately beneath the main shaft of the machine. As a consequence any irregularities in the surface do not vary the distance between the cones and the two supporting-wheels, so that the cones are kept at a constant depth below the surface of the earth, thereby tending to pack and raise the dirt. The cones are disposed in relation to each other so that their outer lines of cleavage with the earth, as indicated by the dotted lines X X in Fig. 2, are approximately parallel, so that they do not tend to spread the earth adjacent to their outer portions. The cones are provided with parallel spiral grooves $o$ of opposite pitch so disposed as to be practically parallel to the surface of the ground when they pass up and through it, thereby tending to loosen and raise the dirt.

In order to give the traction-wheels proper lateral adjustment, so that the machine may return over the uncovered beets, an adjustable ratchet connection may be used. The hub $a$ of each traction-wheel A is rotatively secured on the shaft B between a ratchet-wheel $a'$ and collar $a^2$. These are each longitudinally adjustable on the shaft B, being secured by suitable set-screws, feathers, or the like. A pawl $a^3$, pivotally secured on the hub $a$, engages the ratchet $a'$, driving the shaft B when the wheel is turning forward in the usual manner.

The operation of the machine is as follows: The drive-wheels are laterally adjusted, so as to place the cones in line with the row to be pulled and also to avoid adjacent rows. The pulling-cones are inclined, so as to enter the ground at an angle which the character of the soil demands. In case it is desirable to discharge the beets at one side of the machine the yoke of the cone-shafts is tilted by the proper lever, so that the beets roll over the lower cone and are thrown out at one side of the machine. The position of the cones beneath the main axis of the machine causes them to ride at a constant distance from the surface of the ground regardless of any irregularities which the draft-wheels encounter.

An important feature of the machine is the adjustment which allows tilting of the pulling-cones, whereby the beets are delivered on one side of the machine or other, as desired, thus giving a clear path for the return of the machine across the field, while the beets are left in a narrow strip where they can be easily gathered. If the pulling-cones were fixed in a horizontal position, the beets would be delivered at random on either side of the machine, thus increasing the trouble of gathering the crop, as well as impeding the passage of the machine.

The position of the cones insures easy draft of the machine, as the approximately parallel lines of cleavage of the outer faces of the cones do not tend to wedge the cones together or to spread the ground on either side of the rows. If the cones converged, the machine would have to move an unnecessary amount of earth, and thus cause useless expenditure of power. Another feature of the machine is the arrangement of the grooves on the cones, which as they pass up lift the earth between the cones and pack it so that the beet-roots are readily pulled without injury.

It will be understood that the construction may be varied to suit the requirements of the machine for different grades of work and that the supporting and traction mechanism are such as to obtain the interaction and coöperation of parts, the minor details not forming a part of the application.

The design and arrangement of parts may be varied without departing from the spirit of the invention, and I do not limit myself to any particular form or arrangement except as set forth in the appended claims.

I claim as my invention—

1. A beet-harvester comprising power-driven pulling mechanism and means to tilt said mechanism in planes transverse to each other.

2. In a beet-harvester, a pair of rotatable pulling-cones whose axes are oblique to each other, and means for adjustably tilting them both laterally and longitudinally.

3. In a beet-harvester, a pair of rotatable pulling-cones so disposed that the outer lines of contact with the surface of the soil are approximately parallel.

4. In a beet-harvester, a pair of rotatable pulling-cones in fixed relative position so that their outer lines of contact with the surface of the ground are approximately parallel, said pair of cones being both laterally and longitudinally tiltable.

5. In a beet-harvester, a pair of rotatable pulling-cones whose peripheries are provided with spirally-arranged grooves.

6. In a beet-harvester a pair of rotatable pulling-cones whose surfaces are provided with oppositely-disposed grooves adapted to move approximately parallel to the surface of the ground as they pass upward therefrom.

7. In a beet-harvester, a pair of rotatable pulling-cones adapted to penetrate the earth, whose axes are oblique to each other.

8. In a beet-harvester, a pulling-cone adapted to penetrate the earth, whose vertical axial plane is oblique to the longitudinal axis of the machine, operatively connected to the traction-wheels of the machine.

In testimony whereof I have signed my name in the presence of two subscribing witnesses.

GEORGE F. CONNER.

Witnesses:
D. E. PURDY,
H. J. SCHROEDER.